United States Patent [19]

Kitai et al.

[11] Patent Number: 4,746,208
[45] Date of Patent: May 24, 1988

[54] METHOD AND AN APPARATUS FOR EXPANDING MAGNIFICATION RANGE OF A PHOTOGRAPHIC PROJECTOR

[75] Inventors: Makoto Kitai; Takashi Omori, both of Kyoto, Japan

[73] Assignee: Dainippon Screen Mfg. Co., Ltd., Japan

[21] Appl. No.: 847,945

[22] Filed: Apr. 3, 1986

[30] Foreign Application Priority Data

Apr. 3, 1985 [JP] Japan .................................. 60-69067

[51] Int. Cl.$^4$ .............................................. G03B 21/22
[52] U.S. Cl. ...................................... 353/101; 353/76
[58] Field of Search ................................. 353/101, 76; 355/55–59, 63

[56] References Cited

U.S. PATENT DOCUMENTS

| | | | |
|---|---|---|---|
| 2,303,920 | 12/1942 | Drucker | 355/63 |
| 2,455,142 | 11/1948 | Simmon et al. | 355/63 |
| 3,832,058 | 8/1974 | Gusovius | 355/61 X |
| 3,992,097 | 11/1976 | Jensen | 355/61 X |
| 4,097,136 | 6/1978 | Astarloa | 355/63 X |
| 4,451,142 | 5/1984 | Takenaka | 355/55 |
| 4,555,165 | 11/1985 | Negoro | 355/55 X |

Primary Examiner—Harry N. Haroian
Attorney, Agent, or Firm—Ostrolenk, Faber, Gerb & Soffen

[57] ABSTRACT

The photographic projector is adapted that a lens seating plate to which a projecting lens is fixed is provided so that it maybe moved in the optical direction with respect to the lens holder. When the base of the lens holder reaches even to the end of its stroke, distance of the original picture or that of the picture image from the base of the lens holder is still deficient in reaching to the value which corresponds to desired magnification, the lens seating plate is moved a desired amount along the optical axis so that the lens may be set up a position corresponding to any desired magnification.

8 Claims, 5 Drawing Sheets

METHOD AND AN APPARATUS FOR EXPANDING MAGNIFICATION RANGE OF A PHOTOGRAPHIC PROJECTOR

BACKGROUND OF THE INVENTION

The present invention relates to a photographic projector, and more particularly to a photographic projector that projects a color image of a relative large original color picture film onto a printing paper with desired magnification to produce an enlarged color print.

Apparatus of this type is known as a photograph enlarger. Enlargers which reproduced a picture image of relatively large color picture original film (for example, a 4×5 inch original), typically have a construction based upon that of a process camera which is used in the field of plate printing.

An example of such apparatus is shown in FIGS. 4 and 5. In such apparatus, the photographic projector includes a support member 3 erected at the rear surface 4 of a lower frame 1 which is provided with an easel 2 on its upper surface. An original picture holder 100, which holds an original picture film 7, is mounted to be movable in the vertical direction along a guide rail 4 which is fitted to an appropriate position of the support member 3. The original picture holder 100 includes an original picture frame 6 which holds the original film 7 (hereinafter, refer to "original picture") at a predetermined position, an original picture holder base 5 which couples frame 6 to rail 4 and a lamp housing 8, for accommodating a light source (not shown) which project light through the original picture 7.

Under the original picture frame 6 there is provided a lens holder 110 which is coupled to and movable in the vertical direction along the guide rail 4. The lens holder 110 includes a lens seating plate 10 which supports a lens 11 for projecting light and a lens holder base 9. Between the original picture holder 100 and the lens holder 102 there is provided a bellows 12 for shielding the light.

Rotary encoders 13 and 14 are attached to the bases 5 and 9, respectively. The original picture holder 100 and/or the lens holder 110 are moved, in response to the engagement of gears 15 and 16 secured to each of their axes with a rack 17 erected vertically with respect to the support 3, respecitvely. When either or both of the picture holder 100 or the lens holder 102 are moved, respective pulses are generated according to the distance it (they) move. By counting the number of these pulses, the positions of the original picture holder 100 (and therefor original picture 7) and the lens holder 110 (and therefor lens 11) may be calculated and based on these results, the positions at which the original picture holder 100 and the lens holder 102 are to be located may be controlled. In this manner, the reproduced picture image may be focused with a desired magnification. The magnification can be controlled as a function of the positions of the original picture holder (and therefor picture 7) and the lens holder 102 (and therefor lens 11) based on the following known lens equation;

$1/a + 1/b = 1/f, \; m = b/a$ $a = f \times (1 + m)$ $b = f \times 1/(1 + m)$

Wherein:

a: distance between an original picture 7 and the lens 11 (original picture distance)
b: distance between the lens 11 and the focusing plane 2 (picture image distance)
f: focal distance of the lens
m: magnification Accordingly, there are means which can make them bring more closely with each other by varying appropriately the size of the original picture and that of a desired reproduction picture.

As described above, when the magnification m is obtained as a function of the relative sizes of the original picture and reproduction picture, the positions at which the original picture holder 100 (and therefor picture 7) and the lens holder 102 (and therefor lens 11) should be located can be calculated. For example, when the magnification ratio is 1:1, as shown in FIG. 4, the "original picture distance a" and "the picture image distance b" are both $2 \times f$.

However, the range of magnification which this kind of photograph projector can achieve is limited to a range determined by the mechanism of the apparatus. For example, in FIG. 5, there is shown a state in which magnification of the apparatus shown in FIG. 4 is set at 5:1. As shown by arrow A, the lower end portion picture of the picture holder base 5 and the upper edge portion of the lens holder base 9 must overlap at the identified portion to achieve the desired magnification. In the prior art apparatus the bases 5 and 9 would collide with each other before reaching this state. As a result, the range of magnification which can be achieved by this apparatus is less than 5 to 1.

In view of the foregoing, the prior art has proposed the following apparatus to increase the possible magnification levels.

One proposal suggests that the shape of the bases 5 and 6 be modified so that they can approach more closely than they previously could. For example, the under surface of the base 5 and the upper surface of the base 6 may be flattened so that the original picture frame 6 and the lens seating plate 10 may approach a position at which they are nearly in contact with each other.

However, when the size of the bases 5 and 6 are excessively small in the vertical direction, the picture frames 6 and lens seating plate 10 are secured in an unstable manner. As a result, the size of the bases 5 and 9 can not be made smaller than a certain value, and the degree to which either base has been flattening one plane must be compensated for by increasing the size of the reverse side of the base. This is likely to create other drawbacks in the overall structure. That is, if the frame base 5 is extended in the upper direction, the entire height of the supporting rod 4 must be extended to the same degree. If the lens holder base 9 is extended downwardly, the degree to which the lens holder base 9 can be reduced is limited since the base 9 is likely to interfere with the easel plane 2 as the lens holder 10 approaches the easel plane 2 as shown in phantom in FIG. 5. As a result, there are some cases in which a desired picture image focal distance can not be obtained.

One other proposal for making the original picture frame 6 approach to the lens holder 10, makes the width of the lens holder base 9 narrower than that of the original picture holder base 9 and causes the bases 5 and 9 to be moved along different guide rails. The lens holder base 9, is free to move into the inside of the original picture holder base 5. However, in this proposal two sets of guide rails, which are required increases the amount of material required, increasing in the number of assemblies, etc. This increases the cost of the enlarger. Another proposal uses a "convex cone" and a "concave cone". In this arrangement, a small seating plate is detachably mounted on the central portion of the lens holder 10, and as usual the lens 11 is equipped with this small seating plate. However, when large magnification projection is required (in wihch case the original picture frame base 5 may collide with that of the lens holder base 9), the small seating plate is replaced with a concave cone having a cup shape (that is, a cone the central portion of which is concave), and further the lens 11 is equipped with the bottom of the concave cove. By this arrangement, the original picture may be brought close to the lens 11 than is possible with the use of the standard seating plate and a focused picture image having any desired large modification is obtained. When a reduced magnification projection is required, the convex cone is used.

In this arrangement, there is no need to apply any particular modification to the original picture frame and the lens holder bases 5, 9. It is only necessary to modify the lens seating plate 10, so that this arrangement can be realized relatively easily. However, the position at which the lens 11 is fixed differs from that when a standard lens seating plate is used, so that when the lens 11 is to be focused, it is necessary to compensate for this difference. Particularly, in such apparatus which is provided with an auto focusing means as shown in FIG. 4, because the auto focusing means is adapted to control the position of the lens holder 110 according to the number of pulses generated from a rotary encoder 14, if the position of the lens relative to the lens holder 110 is changed, the enlarger will be out of focus. In order to compensate for this variation in lens position, it is necessary to discriminate operation data depending on whether or not the adapter is being used. This is quite inconvenient.

In addition, in practical use the standard lens seating plate 10 and the concave cone or the convex cone must be exchanged. As a function of the desired magnification value these exchanges require troublesome work.

SUMMARY OF THE INVENTION

In view of the above described problems with the conventional art, the present invention aims to solve those problems, accordingly, it is a main object of the present invention to provide a means for expanding the range of reproduction magnification by merely providing a relatively simple improvement to the lens holder without requiring any particular modification to the apparatus body.

In the photograph projector according to the present invention the lens seating plate which supports the projecting lens may be moved in the optical axis direction of the lens relative to the lens holder base. That is, the present invention ensures that when the lens holder base reaches the end of its travel, the distance of the lens to the original picture or the picture image plane, may be changed by causing the lens seating plate to move a desired amount along the optical axis so that the lens may be moved to a position corresponding to the desired magnification. To this end, a driving means for moving the lens seating plate in the optical axis direction along the guide rail is preferably mounted on the lens holder base, and as required, moves the lens seating plate in the predetermined direction in response to the driving means so that the lens is set up at the position which corresponds to the desired magnification value.

In the case of applying the present invention to an auto focus type photograph projector, means for generating pulse signals according to the amount of movement of the lens is attached to the driving means. The pulse signals are associated with pulse signals generated as a function of the movement of the lens frame base, and by controlling the position of the lens seating plate (and therefor the lens), an auto focusing operation can be realized.

In the present invention since the original picture frame base and the lens holder base may be of sufficient size to maintain the stability of the original picture frame and the lens seating plate, and since the projecting lens may be moved relative to the original picture and the picture image plane, any desired magnification may be achieved and the range of magnification can be quite rationally enlarged.

DESCRIPTION OF THE PREFERRED EMBODIMENTS

Figure 1:
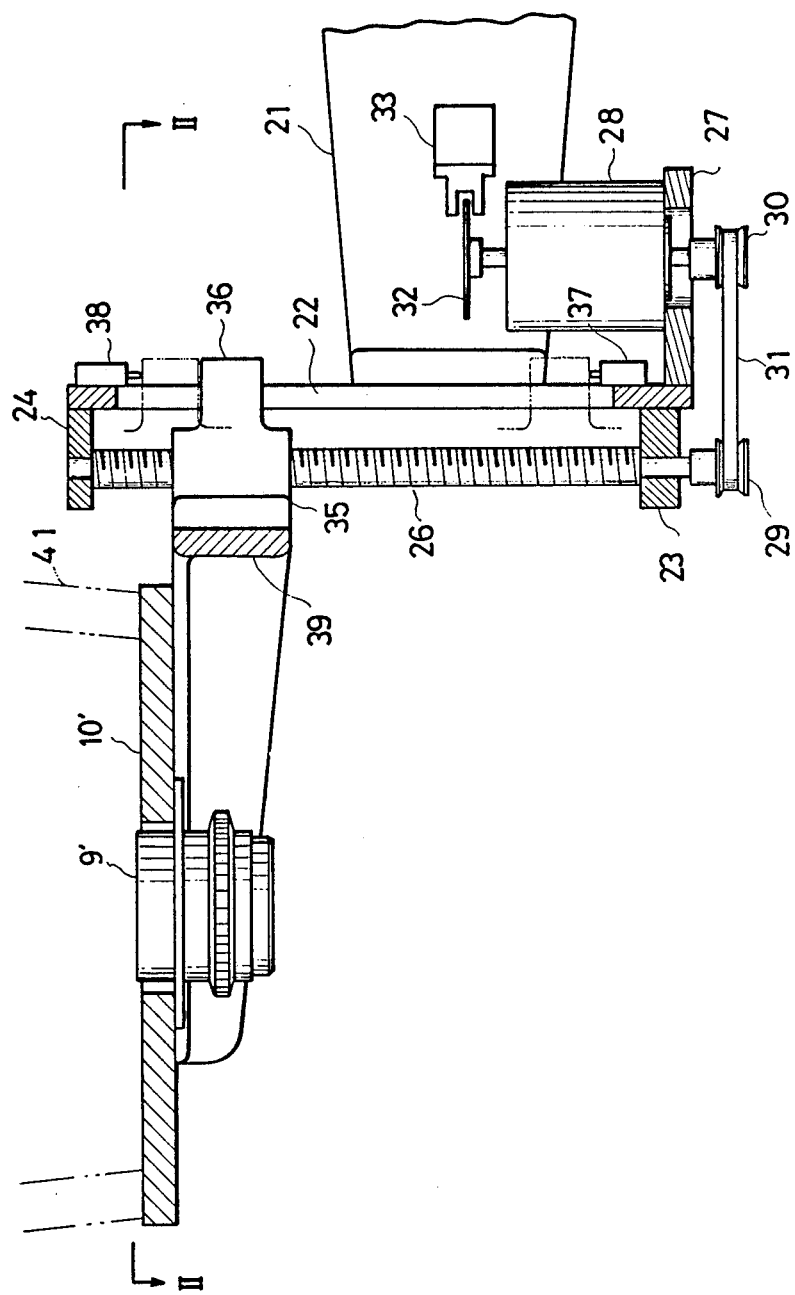
FIG. 1 is a side elevational view showing the main part of an embodiment of the present invention.
Figure 2:
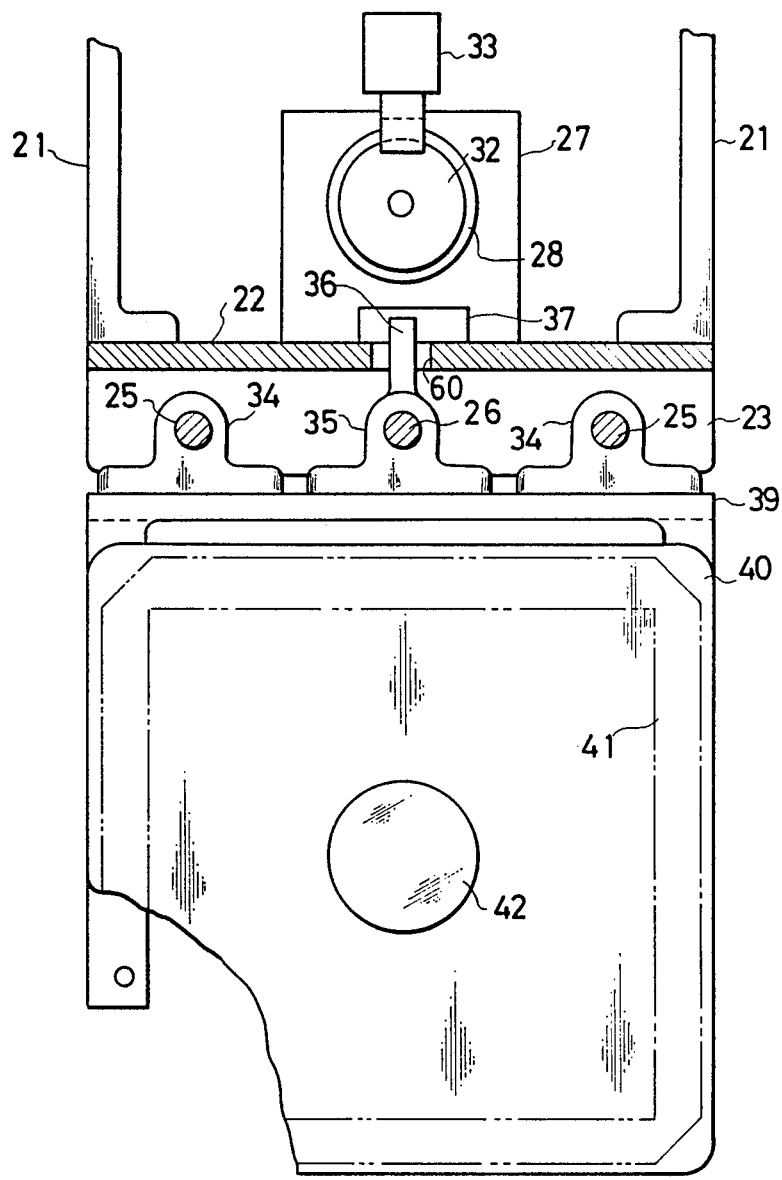
FIG. 2 is a flat sectional view taken along line II—II of FIG. 1.
Figure 4:
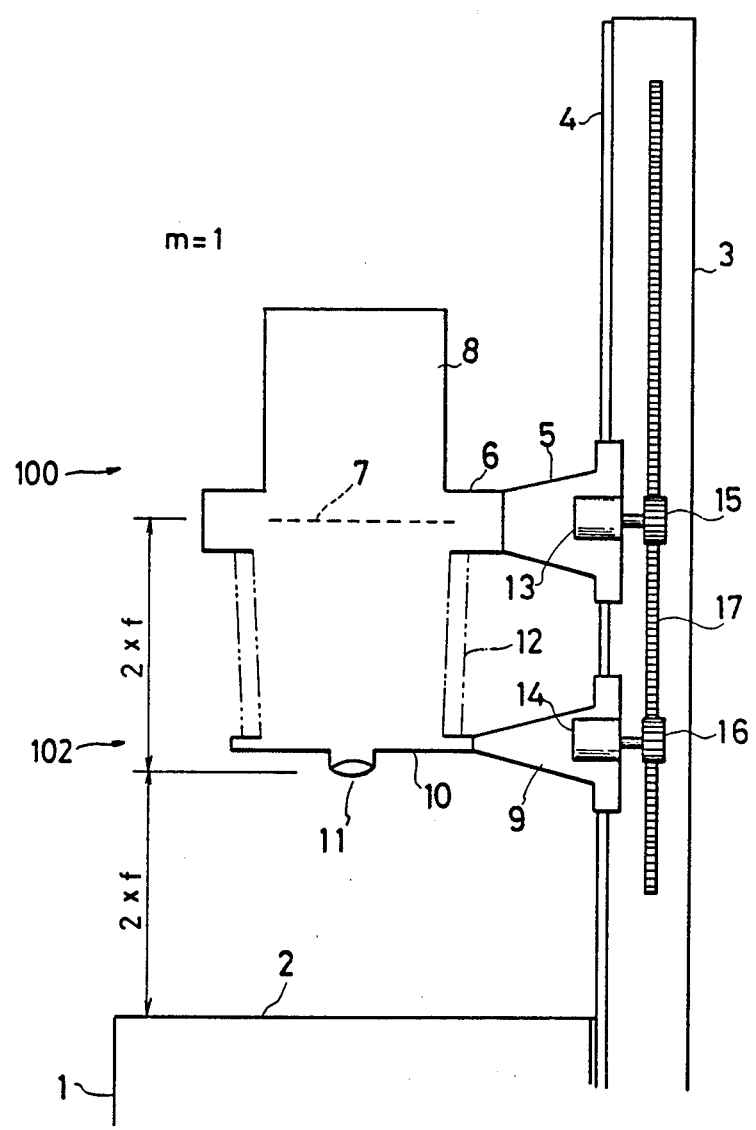
FIGS. 4 and 5 are schematic views of the conventional apparatus.
Figure 5:
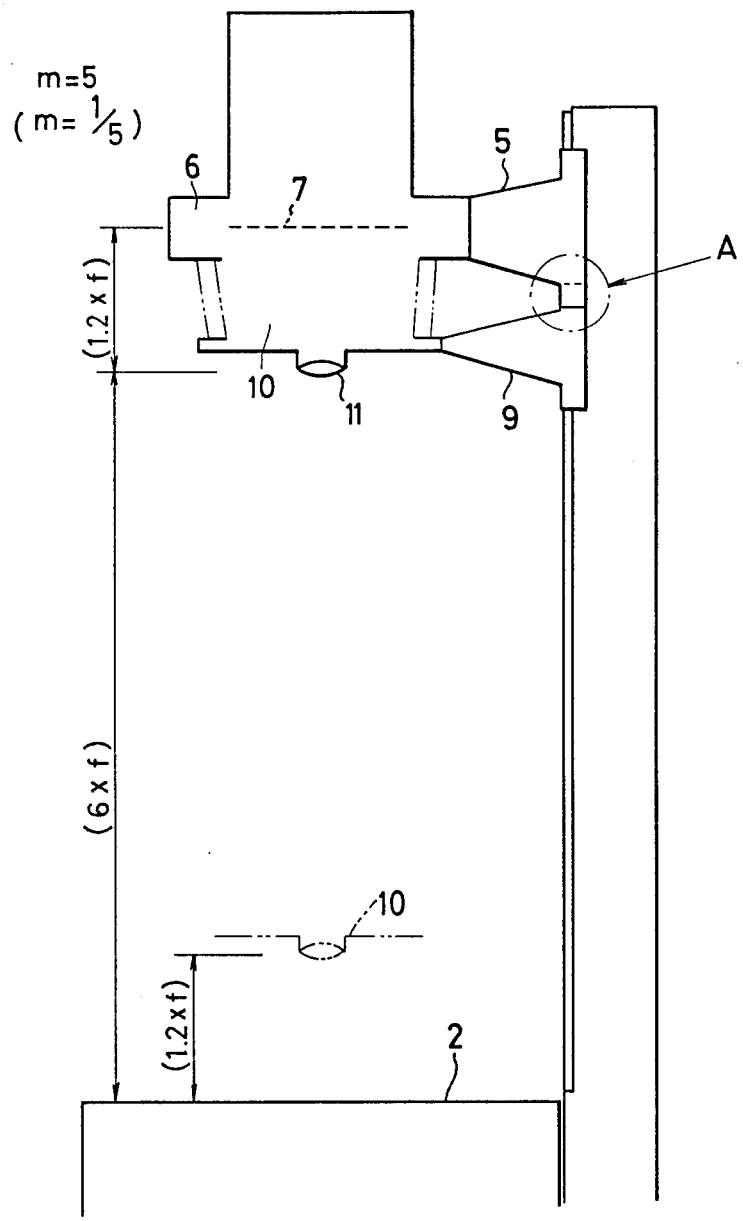

FIG. 1 is a side elevational view showing the modified lens holder 110 of the present invention, and FIG. 2 is a sectional view taken along line II—II of FIG. 1. The modified lens holder 102 is coupled to the remaining parts of the enlarger of FIGS. 4 and 5. A pair of brackets 21, 21' extend horizontally from the lens holder base 9 and support a vertically extending mounting plate 22. Two bearing plates 23 and 24 are mounted at the upper and the lower ends of the mounting plate and fixedly support a pair of guide bars 25 and 25' in a direction parallel to the optical axis of lens 9'. Bearing plates 23 and 24 rotatably support a screw means 26 for driving the lens seating plate 10' also in a direction parallel to the optical axis. The lower end of screw means 26 penetrates the lower bearing plate 23 and extends downwardly therethrough. At the lower end of the screw means, a pulley 29 is provided. A motor support plate 27 is mounted on the lower rear part of the mounting plate 22 so that it may face to the rear on which a motor 28 is equipped. A shaft of the motor 28 extends under the support plate 27 and at the lower end of the shaft there a provided a pulley 30. A timing belt 31 is stretched between the two pulleys 29 and 30, and the screw means 26 is driven by motor 28. The shaft of the motor 28 also projects upwardly over the motor and supports a rotary plate 32, the rotary plate 32, the shaft and a detector 33 cooperate to define a rotary encoder which generates pulses the number of which corresponds to an amount of rotation of the motor 28. The rotary encoder may be any well known device such as a photoelectric type which comprises, for example, a rotary plate which is formed by providing light transparent portions and light interrupting portions each of which is alternately located at the peripheral edge thereof, a projecting light source and a light receiving part which put the peripheral edge between themselves, and electromagnetic typed rotary encoder comprising a gear like rotary plate and magnetic switch, etc.

Respective sliding members 34 and 34' are fitted on each guide bar 25 and 25', and a nut 25 is screwedly engaged on the screw means. Sliding members 34, 34' and nut 35 are mounted on a bracket 39 having U shaped profile, and are caused to ascending and descending in response to rotary movement of the screws means 26 which is driven by the motor 28. A projection 36, which projects rearwardly through a slot 60 formed in the supporting plate 22, engages the nut 35. Limit switches 38 and 37 are disposed at the upper end and the lower end of the slot 60, respectively, to stop the motor 28 when the nut 35 reaches the respective end of its travel. A lens seating plate 10' is securely mounted to the U shape bracket 39. The lens seating plate 10' and the original picture frame 5 (FIG. 4) are connected by bellows 41, and a projection lens 11' is fixed at the central portion of the lens holder.

When the lens holder base 9 reaches the end of its travel, the lens seating plate 10' is moved further in the desired direction to move the projecting lens 11' toward either the original picture 7 or the plane of the easel 2. As a result, the photograph projector has a wider magnification range than that of the conventional photograph projector in which the lens seating plate 10' is fixed to relative to the lens holder 110. In the apparatus shown in FIG. 1, by setting up the length l of the stroke of movement, assuming that the lens seating plate 10' in the photograph projector of the conventional type in which the lens seating plate is fixed relative to the lens holder 110 is located at the central point of the stroke of movement, when the base of the lens holder reaches the end of its travel, (for example, when the base of the lens contacts the original picture frame etc.), the lens seating plate 10' can be moved in the same direction by an additional range of [l/2], so that it is possible to approach more closely to the surface of the original picture 7 or that of the easel 2. Thus, according to the present invention, the applicable magnification range is nearly same as those cases in which said concave cone or said convex cone is used.

In the case of applying the present invention to a photograph projector of auto-focusing type, it is necessary to correct positional data of the lens holder based upon positional data of a lens 11' detected by the rotary encoder comprising of the rotary plate 32 and the detector 33. That is, the focused state determined by the aforementioned lens formula is obtained in the case of the lens seating plate 10' being set at a standard point in the stroke of movement along the guide rail 25. And in the case of carrying out projection with a large ratio of projection magnification or a large ratio of reduction magnification which can not be realized by positioning the lens seating plate 10' at the standard point, even if the lens seating plate 10' is moved along the guide rail 25, an accurate focused state can not be obtained solely using positional data based on the output pulses of the rotary encoder 13 and 14 coupled to the original picture frame base 5 and the lens holder base 9 shown in FIG. 4. In order to compensate the variation in the position of the lens 11' instead of using the distances "original picture distance a" and "picture image distance b" in the lens formula, a sum of the positional data of each of the bases and the variation of the lens holder 40 relative to the lens holder base is used. That is, if an amount of movement of the lens holder from the standard point is equal to s, (1) in the case of enlargement (expansion):
original picture distance (distance from the standard point to the original picture surface)

$$a \leftarrow (a-s)$$

picture image distance (distance from the standard point to the picture image)

$$b \leftarrow (b+s)$$

(2) in the case of reduction:
original picture distance $$a \leftarrow (a+s)$$

picture image distance $$b \leftarrow (b-s)$$

Figure 3:
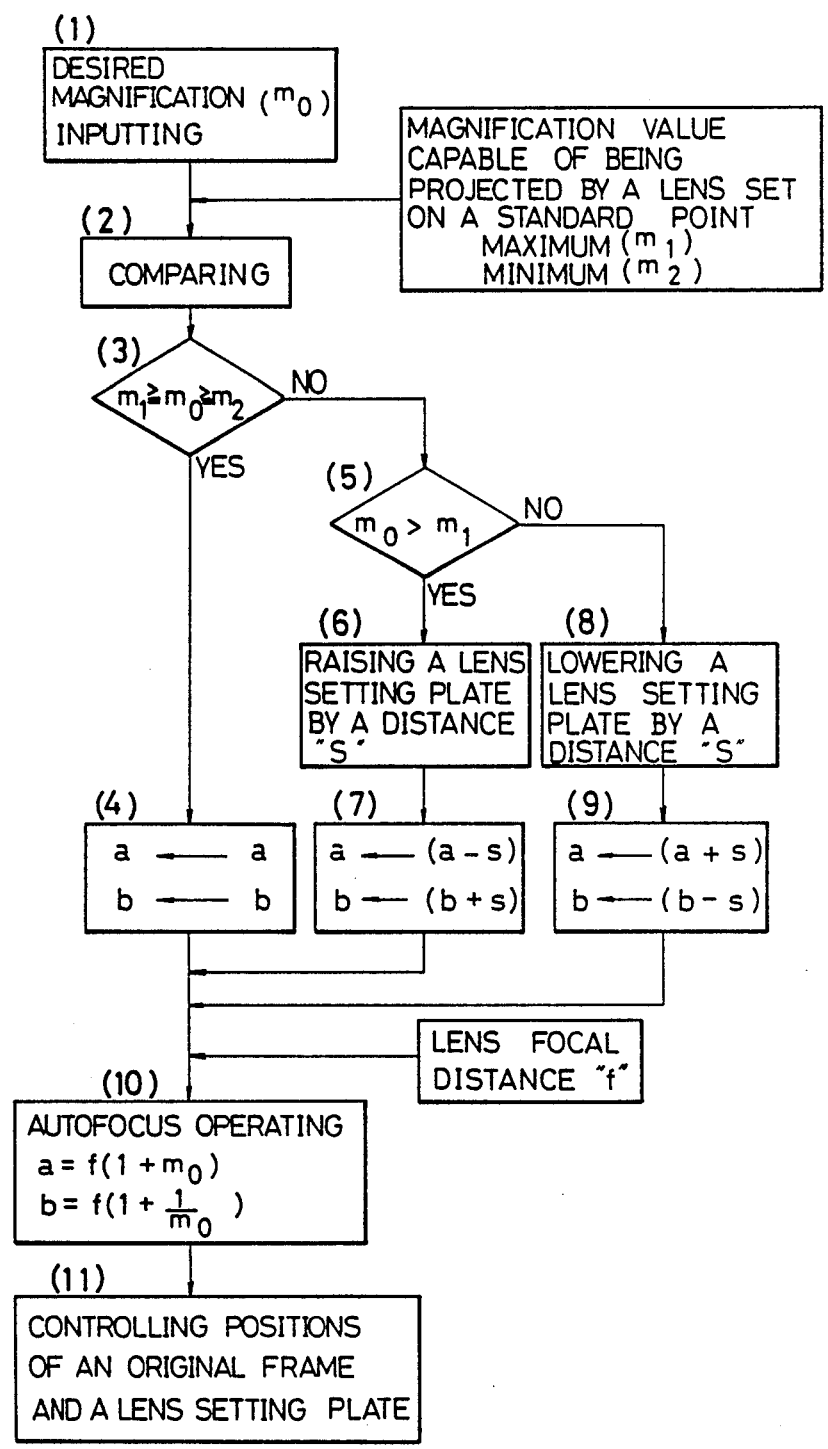
FIG. 3 is a flow chart explaining the operation of the embodiment of the present invention.

By substituting these distances for distances a and b, and by operating according to the substitution, an auto focusing mechanism can be actuated by applying the same operational process having been applied in the case of the lens seating plate 10' being disposed on the standard point. It is desired that this operational process is made so that the lens seating plate 10' may be moved in the desired direction automatically when a magnification value which exceeds a previously determined magnification range which can be realized in the case of the lens seating plate 10' being disposed on the standard point by basing previously on the focal distance of the lens 11' and construction of the photograph projector is input to a control means. For example, making up operation process as the flow chart shown in FIG. 3, movement of the lens seating plate and focusing can be carried out automatically. That is, Step (1): input the desired magnification value $[m_0]$.

Step (2): compare the magnification range of $[m_1 - m_2]$ which is obtainable in the case of the given condition that the lens is disposed at the standard point with the magnification range of $[m_0]$.

Step (3): judge whether or not the magnification value of $[m_0]$ is within the range of the magnification $[m_1 - m_2]$.

Step (4): in the case of the step (3) being [Yes], do not vary [a] and [b].

Step (5): in the case of the step (3) being [No], $[m_0 > m_1]$ is judged.

Step (6): in the case of the step (5) being [Yes], raise the lens seating plate by distance of [s].

Step (7): replace [a] with [a−s], and [b] with [b−s], respectively.

Step (8): in the case of the step (5) being [No], lower the lens seating plate by the distance [s].

Step (9): replace [a] with [a+s], and [b] with [b−s], respectively.

Step (10): basing on the given conditions, the lens focal length [f], the steps (4) or (7) or [a] and [b] of the step (9), determine the required positions of the original picture frame and the lens holder for the magnification value being $[m_0]$.

Step (11): move the original picture frame and the lens holder to required positions according to the result of step (10).

The concrete example of the auto focusing mechanism at the steps (10) and (11) has been already well known, for example, it has been disclosed in the specification of the U.S. Pat. No. 3,832,058, Japanese Patent Laid-Open Publication No. 47-3478 etc., so that descriptions therefor are abbreviated.

The present invention has the following advantages, that is;

(1) Merely by adding relatively simple modification to the lens holder, the photograph projector according to the present invention can be expanded magnification range wider than that of the standard photograph projector in which the lens seating plate is fixed to the lens holder base.

(2) The photograph projector has less troublesome in mounting and removing the seating plate and the lens in comparison with the conventional standard photograph projector, in addition, according to the present invention, it is possible to prevent troublesome accidents such as lens fall or the like from occurring.

(3) By only inputting the desired magnification value [$m_0$] the lens seating plate is moved automatically accordingly, there is no apprehensions of committing erroneous operation.

What is claimed is:

1. A photograph projector, comprising:
   (A) an original picture frame for holding an original picture;
   (B) a lens holder for holding a projecting lens, said lens holder being moveable in a direction parallel to an optical axis of said lens between uppermost and lowermost positions, a lens seating plate forming part of said lens holder and supporting said lens, said lens seating plate normally supporting said lens at a predetermined position relative to said lens holder but being moveable relative to said lens holder along said axis;
   (C) an easel for supporting a photosensitive material along a reproduction plane, said original picture, said lens and said reproduction plane all being disposed along said optical axis; and
   (D) first means for determining if said projector can be focused with a desired magnification with said seating plate being located at said predetermined position;
   (E) second means responsive to said first means for moving said lens holder, with said seating plate being situated at said predetermined position, and at least one of said original picture frame and said easel to the locations required to focus said projector with said desired magnification, if said first means determines that said projector can be focused with the desired magnification with said seating plate being located at said predetermined position; and
   (F) third means responsive to said first means for moving said seating plate relative to said lens holder and moving said lens holder and at least one of said original picture frame and said easel to focus said projector with said desired magnification if said first means determines that said projector cannot be focused with a desired magnification with said seating plate being located at the predetermined position.

2. The photographic projector of claim 1, wherein said third means moves said lens seating plate in the direction of said original picture frame when additional magnification is required.

3. The photograph projector of claim 1, wherein said third means moves said seating plate away from said original picture frame when less magnification is required.

4. The photograph projector of any one of claim 1, 2 or 3, wherein said first means utilizes the same lens equation to determine the required locations of said original picture frame, said lens holder, said easel and said lens seating plate whether said lens seating plate is in said predetermined position and when said lens seating plate is moved from said predetermined position.

5. A method for focusing a photographic projector in accordance with a desired magnification in which an original picture frame which holds an original picture, a lens holder which holds a projecting lens and an easel which supports a photosensitive material are disposed along an optical axis of said projecting lens, said lens holder being moveable in a direction parallel to said optical axis between uppermost and lowermost positions, a lens seating plate forming part of said lens holder and supporting said lens, said lens seating plate normally supporting said lens at a predetermined position relative to said lens holder but being moveable relative to said lens holder along said axis, said method comprising the steps of:
   determining if said projector can be focused with said desired magnification with said seating plate being located at said predetermined position; and thereafter
   if the answer to said determining step is yes, moving said lens holder, with said seating plate at said predetermined position, and at least one of said original picture frame and said easel to the locations required to focus said projector with said desired magnification; and
   if the answer to said determining step is no, moving said seating plate relative to said lens holder and moving said lens holder and at least one of said original picture frame and said easel to the required locations to focus said projector with said desired magnification.

6. A method for focusing a photograph projector according to claim 5, wherein said lens seating plate is moved in the direction of said original picture frame when additional magnification is required.

7. A method for focusing a photograph projector according to claim 5, said lens seating plate is moved away from said original picture frame when less magnification is required.

8. A method for focusing a photograph projector according to any one of claims 5, 6 or 7, wherein the same lens equation is used to determine the required relative positions of said lens holder, said original picture frame, said easel and said seating plate whether the answer to said determining step is yes or no.

* * * * *

UNITED STATES PATENT AND TRADEMARK OFFICE
CERTIFICATE OF CORRECTION

PATENT NO. : 4,746,208

DATED : May 24, 1988

INVENTOR(S) : Makoto Kitai et al.

It is certified that error appears in the above-identified patent and that said Letters Patent is hereby corrected as shown below:

ON THE TITLE PAGE:

After "Assignee: Dainippon Screen Mfg. Co., Ltd.", add --and Kabushiki Kaisha Shashin Kogyo--.

Signed and Sealed this

Twenty-sixth Day of September, 1989

Attest:

DONALD J. QUIGG

*Attesting Officer*      *Commissioner of Patents and Trademarks*